(12) United States Patent
Uchiyama et al.

(10) Patent No.: US 6,483,991 B2
(45) Date of Patent: Nov. 19, 2002

(54) WATERPROOF TYPE PHOTOGRAPHING APPARATUS AND PACKAGE FOR LENS-FITTED PHOTO FILM UNIT

(75) Inventors: Keiji Uchiyama; Kenji Negishi; Yukito Suzuki, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/770,382

(22) Filed: Jan. 29, 2001

(65) Prior Publication Data

US 2001/0005452 A1 Jun. 28, 2001

(30) Foreign Application Priority Data

Feb. 2, 2000 (JP) ......................................... 2000-025648

(51) Int. Cl.[7] ............................................... G03B 17/08
(52) U.S. Cl. ............................................. 396/6; 396/25
(58) Field of Search ................................. 396/6, 25, 27, 396/28, 29; 348/81

(56) References Cited

FOREIGN PATENT DOCUMENTS

JP          2000-292889      * 10/2000   ............ G03C/3/00

* cited by examiner

*Primary Examiner*—W. B. Perkey
(74) *Attorney, Agent, or Firm*—Young & Thompson

(57) ABSTRACT

A tablet shaped catalyst is disposed on an upper portion inside a waterproof housing. The catalyst, which is comprised of palladium, accelerates a chemical reaction for combining hydrogen gas and oxygen gas. The catalyst begins accelerating the chemical reaction just after contacting with hydrogen gas. By disposing said catalyst on an upper position inside the waterproof housing, hydrogen gas, lighter than the air, is effectively removed. This chemical reaction causes to generate water, so it is preferable to provide a water absorbent by the catalyst.

12 Claims, 7 Drawing Sheets

| AMOUNT OF INJECTED $H_2$ | RESIDUAL $H_2$ (WITH CATALYST) | RESIDUAL $H_2$ (WITHOUT CATALYST) |
|---|---|---|
| 10 cc | 0 cc | 9.64 cc |
| 20 cc | 0.01 cc | 15.4 cc |
| 30 cc | 0.01 cc | 15.6 cc |

WATERPROOF TYPE PHOTOGRAPHING APPARATUS AND PACKAGE FOR LENS-FITTED PHOTO FILM UNIT

BACKGROUND OF THE INVENTION

1. Field of the Invention

The present invention relates to a waterproof type photographing apparatus like a waterproof lens-fitted photo film unit, and a package for containing lens-fitted photo film unit in an airtight manner.

2. Background Arts

A lens-fitted photo film unit has a simple photographing mechanism and is pre-loaded with a film cartridge with an unexposed photo film. Owing to convenience and low price, the lens-fitted photo film unit, hereinafter referred to simply as the film unit, is widely used as a kind of simple cameras. There are various types of the film units adapted to purposes and situations in photography. For example, for the purpose of underwater photography, kinds of waterproof type lens-fitted photo film unit are sold. The water proof type lens-fitted photo film unit, hereinafter referred to simply as the waterproof film unit, is constituted by a film unit and a waterproof housing for containing the film unit in a watertight manner. The photographing mechanism is operable externally by use of a winding wheel and a shutter lever disposed through the waterproof housing.

A waterproof photographing apparatus, such as a waterproof camera with photo film or a waterproof electronic still camera, is also provided. Such apparatus is constructed for its purpose, for example, an underwater photography or a water washing. Besides, an exclusive waterproof housing for a photographing apparatus is well known. This waterproof housing makes it possible to carry out underwater photography by operating the apparatus externally.

The above mentioned photographing apparatus has a dry battery as a power supplying source. For example, the film unit has a dry battery in the flash device. Some dry battery discharges hydrogen gas gradually by using the film unit. Furthermore, the flash device has a capacitor that discharges hydrogen gas according to deterioration with time thereof.

Hydrogen gas generated in this way is accumulated in the waterproof housing of the photographing apparatus. In a photographing apparatus having a photo film, characteristics of the photo film may be deteriorated because of the reaction with hydrogen gas, which reacts as reducing gas. In a photographing apparatus without a photo film, such problem is not occurred. When an amount of hydrogen gas accumulated in the waterproof housing is increased, however, the apparatus may have a fire because of sparks generated at a contact in an electronic circuit.

In order to prevent the photo film from being deteriorated by humidity, the film unit is contained in a humidity-proof packaging bag in an airtight manner. If the film unit has a dry battery for a flash device or the like, the dry battery generates hydrogen gas which is accumulated in the packaging bag. Therefore, such hydrogen gas may cause a bad influence on the photo film.

SUMMARY OF THE INVENTION

In view of the foregoing, an object of the present invention is to provide a waterproof type photographing apparatus and a packaging bag for containing a film unit capable of removing hydrogen gas effectively so as not to accumulate hydrogen gas, which causes ignition of the apparatus or deterioration of the film.

To achieve the above objects, the waterproof type photographing apparatus of the present invention has a catalyst for accelerating a chemical reaction between hydrogen gas and oxygen gas. Hydrogen gas is generated from a dry battery loaded in the photographing apparatus, and oxygen gas is contained in a waterproof housing for keeping the photographing apparatus in a watertight manner.

The catalyst itself is not changed at all by the chemical reaction, and quite a small amount is needed for removing hydrogen gas. Accordingly, the catalyst is more effective for removing hydrogen gas than a hydrogen gas absorbent. Water is produced by this chemical reaction. Although an amount of water is small, it is preferable to provide a water absorbent (a desiccant) in order to prevent a photo film and a contact in an electronic circuit from being influenced by the water.

In the preferable embodiment of the present invention, a film unit is covered with a waterproof housing in a watertight manner. Although the film unit has a flash device with a dry battery, hydrogen gas is removed by a catalyst provided in the housing. Since hydrogen gas is accumulated upward, it is more preferable to dispose the catalyst on an upper wall of the housing.

Moreover, the present invention is also applicable to a packaging bag for containing a film unit with a flash device. In order to remove hydrogen gas, a catalyst is contained in the packaging bag. Since the packaging bag is humidity-proof, a wrapping label and a spacer sheet are sufficiently dried to be water-absorptive in order to absorb water generated by the chemical reaction. More preferably, a water absorbent may be contained in the packaging bag.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
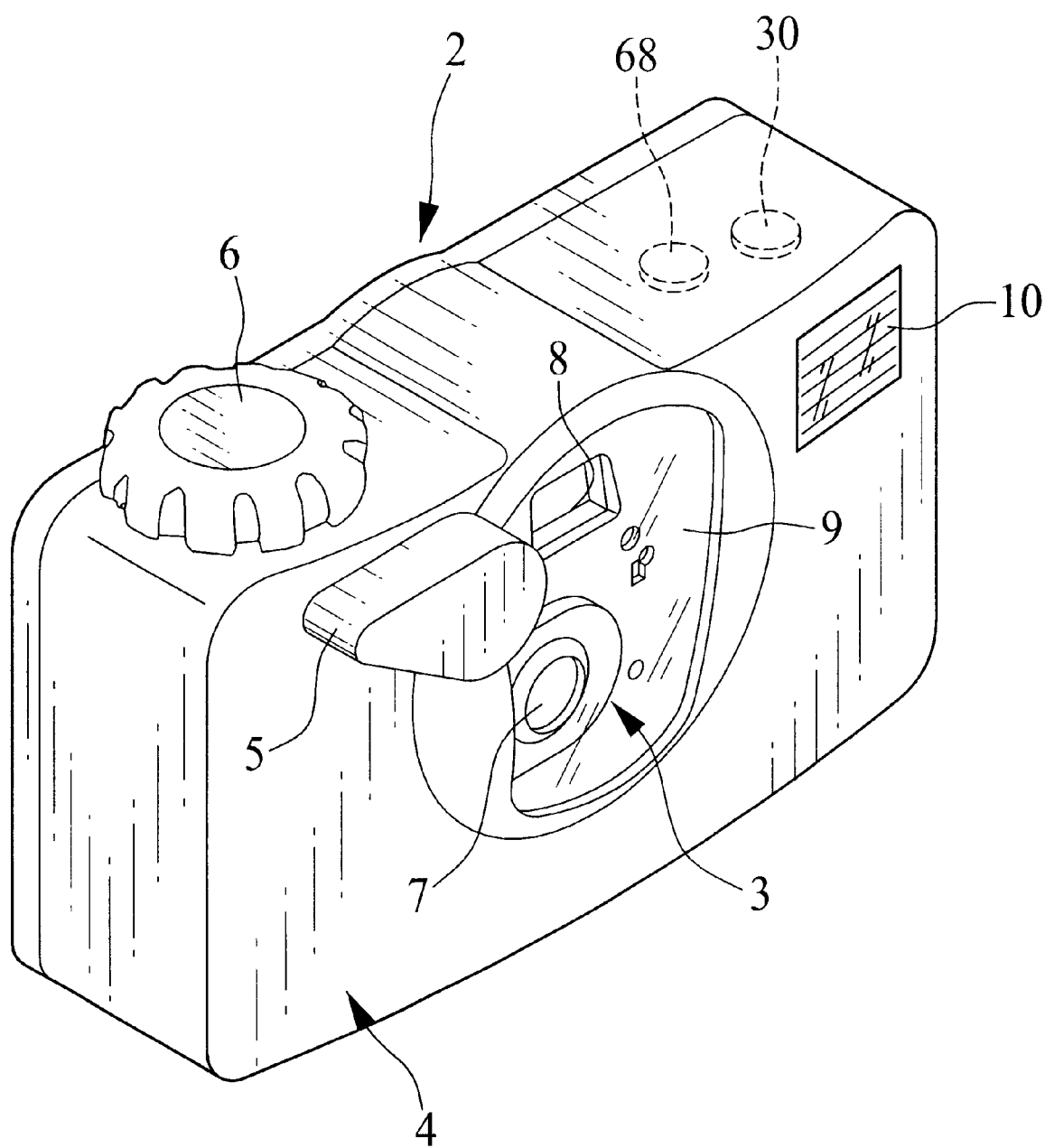
FIG. 1 is a perspective view showing an outside of the waterproof lens-fitted photo film unit of the present invention.

As a simple waterproof type camera, a waterproof film unit will be described below. As shown in FIG. 1, a waterproof film unit 2 is comprised of a film unit 3 and a waterproof housing 4 for containing the film unit 3 in a watertight manner.

A shutter lever 5 for shutter releasing operation is provided on a front wall of the waterproof housing 4. An external winding wheel 6 for winding a photo film is attached to a top wall of the waterproof housing 4. A transparent exposed portion 9 is provided on a front wall of the waterproof housing 4, for exposing a taking lens 7 and viewfinder objective window 8 of the waterproof film unit 3. A flash projecting window 10 is appeared in a corner of the front wall of the waterproof film unit 2.

Figure 2:
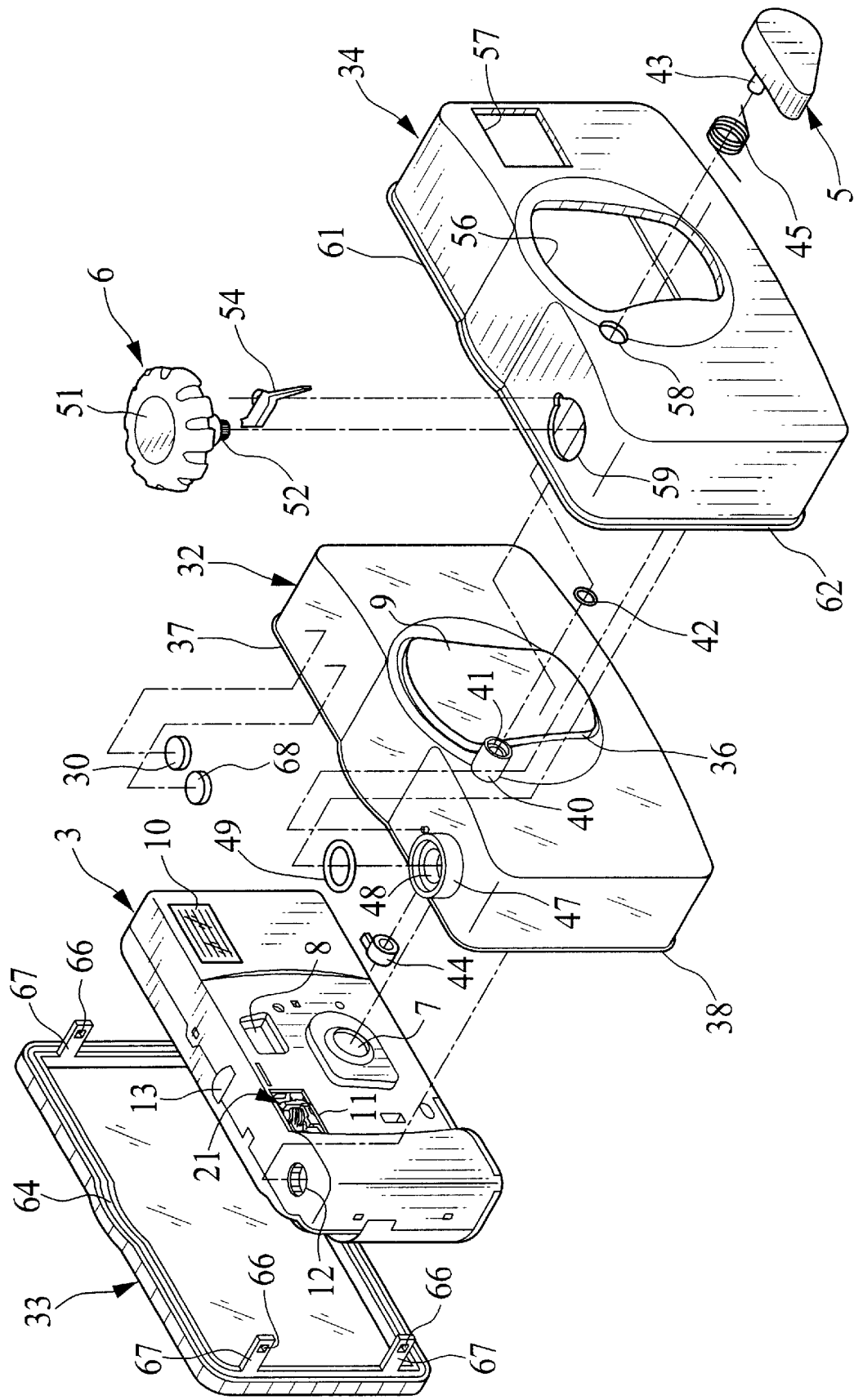
FIG. 2 is an exploded perspective view showing the waterproof film unit of FIG. 1.

As shown in FIG. 2, the taking lens 7, the viewfinder objective window 8, the flash projector 10 and an access opening 11 are provided on the front wall of the film unit 3. A through hole 12 and a frame counter window 13 are provided on an upper wall of the film unit 3. Available frame number for photography is indicated in the frame counter window 13. An eyepiece window 14 (See FIG. 3) is formed in a rear side of the film unit 3.

Figure 3:
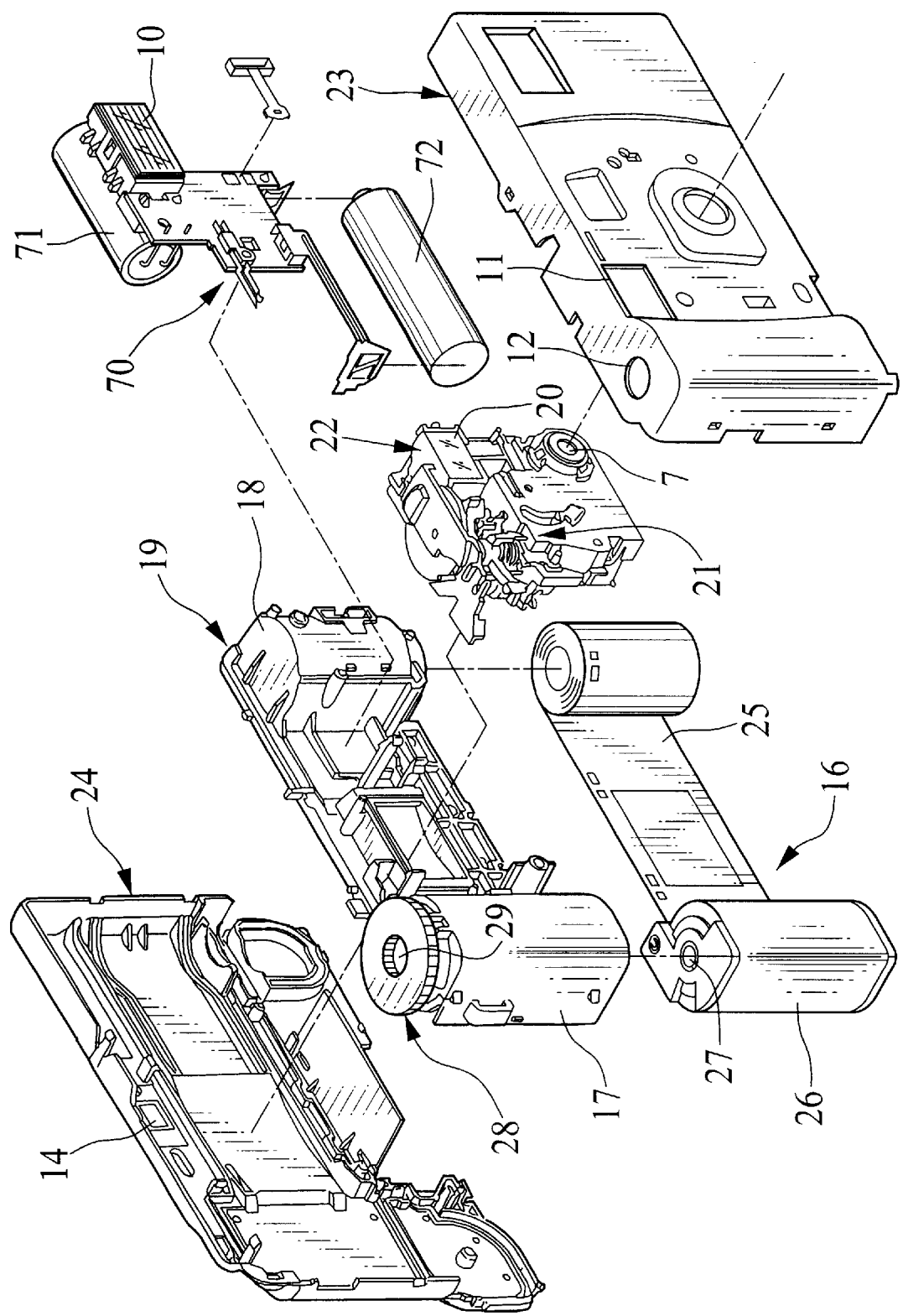
FIG. 3 is an exploded perspective view showing a film unit.

As shown in FIG. 3, a photo film cartridge 16 having a photo film 25 is pre-loaded in the film unit 3. The film unit 3 includes a basic section 19, an exposure unit 22, a flash device 70, a front cover 23 and a rear cover 24. In the basic section 19 are formed a cartridge chamber 17 and a film roll chamber 18. The cart ridge chamber 17 is loaded with the photo film cartridge 15. A roll of photo film 25 drawn from the photo film cartridge 16 is contained in the film roll chamber 18. The exposure unit 22, secured to a front side of the basic section 19, includes the taking lens 7, a viewfinder optical system 20, a shutter driving mechanism 21, an anti-winding mechanism and a frame counter mechanism and the like. The flash device 70 includes a capacitor 71 and a dry battery 72. The basic section 19 is covered with the front cover 23 and the rear cover 24.

An internal winding wheel 28 is rotatable on an upper wall of the cartridge chamber 17. A spool 27 in a cartridge shell 26 is engaged with a shaft of the internal winding wheel 28.

An engaging hole 29 is formed in the center of the internal winding wheel 28, and accessible through the through hole 12 formed in the front cover 23. A shaft of the external winding wheel 6 of the waterproof housing 4 is meshed with the engaging hole 29, so that rotation of the external winding wheel 6 is transmitted to the internal winding wheel 28. Note that a film unit of a general purpose type has a front cover in which a shutter release button is located in the position where the through hole 12 is formed. The access opening 11 renders the shutter driving mechanism 21 of the exposure unit 22 accessible from the outside of the front cover 23.

The film unit 3 is almost the same as a film unit of a general purpose type, but the front cover 23 and the internal winding wheel 28 are exclusive for waterproof type.

In FIG. 2, the waterproof housing 4 includes a waterproof front case 32, a waterproof rear cover 33 and a waterproof cover 34. The waterproof front case 32 has an open rear side, and is fitted to the film unit 3 to cover front, upper, lower and lateral faces. The waterproof rear cover 33 is disposed behind the film unit 3, and fitted to the waterproof front case 32 to close the same. The waterproof cover 34 is colored to be attractive and covers the outside of the waterproof front case 32.

The waterproof front case 32 is made of transparent plastic, and has the exposed portion 9 in a front wall, which exposes the taking lens 7 and the viewfinder objective window 8. A groove 36 is formed around the exposed portion 9. The rear wall of the waterproof front case 32 has an opening 37 for containing the film unit 3. A ridge 38 is provided integrally with the waterproof front case 32 around the opening 37.

A boss 40 in a cylindrical shape is protruded from the front wall of the waterproof front case 32. A hole 41 is defined in the boss 40, and comes through the waterproof front case 32. A small O-ring 42 is fitted on the inside of one end of the hole 41, and prevents moisture, dust or the like from entering the waterproof housing 4 through the hole 41.

The shutter lever 5 has a wedge shape. A pivot 43 is protruded from a rear wall of the shutter lever 5 and is inserted in to the hole 41. A shutter actuation lever 44 in the waterproof front case 32 is secured to the end of the pivot 43 after the shutter lever 5 is inserted in the hole 41.

When the film unit 3 is inserted in the case body 36, the shutter actuation lever 44 enters the access opening 11 in the front cover 23, and is engaged with the shutter driving mechanism 21 in the exposure unit 22. Thereby, when the shutter lever 5 is pressed down, the shutter driving mechanism 21 in the film unit 3 is actuated. A torsion coil spring 45, fitted on the outside of the boss 40, biases the shutter lever 5 in the clockwise direction to return to the initial position regularly.

A boss 47 in a cylindrical shape is protruded from the top of the waterproof front case 32. A hole 48 is defined in the boss 47, and comes through the waterproof front case 32. A shaft of the external winding wheel 6 is inserted in the hole 52 in a rotatable manner. A large O-ring 49, fitted on the inside of one end of the hole 48, prevents moisture, dust or the like from entering the waterproof housing 4 through the hole 48.

The external winding wheel 6 includes a wheel portion 51 and a drive shaft 52. The wheel portion 51 has a wheel shape with a pattern of projections and recesses for being fitted on fingers of a user. The drive shaft 52 is formed on a lower surface of the wheel portion 51. The drive shaft 52 is inserted into the hole 48, and is engaged with the engaging hole 29 in the winding wheel 28 through the through hole 12 in the front cover 23.

When the external winding wheel 6 is rotated in the counterclockwise direction, the internal winding wheel 28 also rotates in the same direction to wind the photo film 25 by one frame. Note that, a claw member is provided outside the drive shaft 52 and engaged with the internal wall of the waterproof front case 32 after the drive shaft 52 is inserted in the hole 48. Accordingly, the claw member keeps the external winding wheel 6 from being pulled out of the waterproof front case 32.

An anti-rewind claw 54 is attached to a lower wall of the external winding wheel 6. When the external winding wheel 6 is rotated in the counterclockwise direction to wind the photo film, one end of the anti-rewind claw 54 is engaged with teeth formed with the inside of the wheel portion 51. The anti-rewind claw 54 is resiliently deformed by the teeth, and generates click noise in a ratchet operation. When the external winding wheel 6 is rotated in the clockwise direction, the anti-rewind claw 54 is firmly engaged with the teeth in the wheel portion 51, and keeps the external winding wheel 6 from rotating in reverse to photo film winding.

The waterproof cover 34 is formed with semitransparent elastomer, which is made from polymer material with elasticity in a manner of rubber. The waterproof cover 34 has similar shape as the waterproof front case 32, but one size larger, so as to cover the outside of the waterproof front case 32 closely. The front portion of the waterproof cover 34 has an opening 56 for uncovering the exposed portion 9 in the base body 32. The front portion of the waterproof cover 34 also has an opening 57 for exposing the flash projecting window 10 through the waterproof front case 32. The front and upper portion of the waterproof cover 34 has openings 58 and 59 for inserting the bosses 40 and 47 respectively. The rear portion of the waterproof cover 34 has an opening 61 for fitting the waterproof front case 32. A ridge 62, provided around the opening 61, covers the ridge 38 of the waterproof front case 32.

The waterproof rear cover 33 is formed with transparent plastic material, and allows external observation in the eyepiece window 14 through itself. The whole edge of the waterproof rear cover 33 is protruded, and has a groove 64 with which the ridge 62 of the waterproof cover 34 and the ridge 38 of the waterproof front case 32 are engaged. A width of the groove 64 is determined slightly smaller than a sum of thickness of the ridges 38 and 62. Thus, the ridge 62 is compressed in the groove 64 to be fitted closely, so that water-tightness between the waterproof cover 34 and the waterproof rear cover 33 is ensured.

Lock portions 67 are formed with edges of the waterproof rear cover 33, two with an upper edge, two with a lower edge. Retaining holes 66 are formed in the lock portions 67. Retaining claws (not shown) are formed with the inside of the waterproof front case 32, and engaged with the lock portions 66. The rear lid 37 is firmly secured to the waterproof front case 32 by claw arrangement. Thereby, the waterproof case 34 is secured to the waterproof rear cover 33 to ensure water-tightness of the waterproof housing 4.

A tablet-shaped catalyst 30 is put on an upper wall inside the waterproof front case 32. The dry battery 72 and the capacitor 71 generates hydrogen gas gradually as the waterproof film unit 2 is used, so that hydrogen gas is accumulated inside the waterproof film unit 2. The catalyst 30 accelerates an chemical reaction to generate water from oxygen gas and hydrogen gas, which is shown in the following reaction formula;

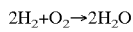

$$2H_2 + O_2 \rightarrow 2H_2O$$

A palladium catalyst may be used as the catalyst 30. In this embodiment, the catalyst 30 is comprised of a palladium catalyst and γ-alumina ($Al_2O_3$) for supporting the palladium catalyst.

Although the catalyst 30 accelerates the reaction of oxygen gas and hydrogen gas, in which the catalyst itself is not changed. Accordingly, the catalyst removes hydrogen gas more effectively than hydrogen absorbent for absorbing hydrogen gas, because absorption efficiency of the hydrogen absorbent is decreased as absorption is proceeded. Considering that hydrogen gas, which has lower specific gravity than air, is likely to accumulate upward inside the waterproof housing 4, it is preferable to dispose the catalyst 30 on an upper wall inside the waterproof front case 32. Therefore, a small amount of the catalyst 30 ensures to remove hydrogen gas effectively. As other materials of the catalyst 30, platinum, ruthenium and rhodium may be used.

Although hydrogen gas is generated from the dry battery 72 and the capacitor 71 by using the waterproof film unit 2, the catalyst 30 removes hydrogen gas by accelerating the chemical reaction with oxygen gas left inside the waterproof front case 32. Thus, the photo film is prevented from fogging due to the chemical reaction with hydrogen gas, which reacts as reducing gas. A water absorbent (a desiccant) 68, such as silica gel, is put nearby the catalyst 30, for absorbing water vapor generated by the reaction of hydrogen gas. Since an amount of water vapor is quite a little, the water absorbent 68 may be omitted.

Figure 4:
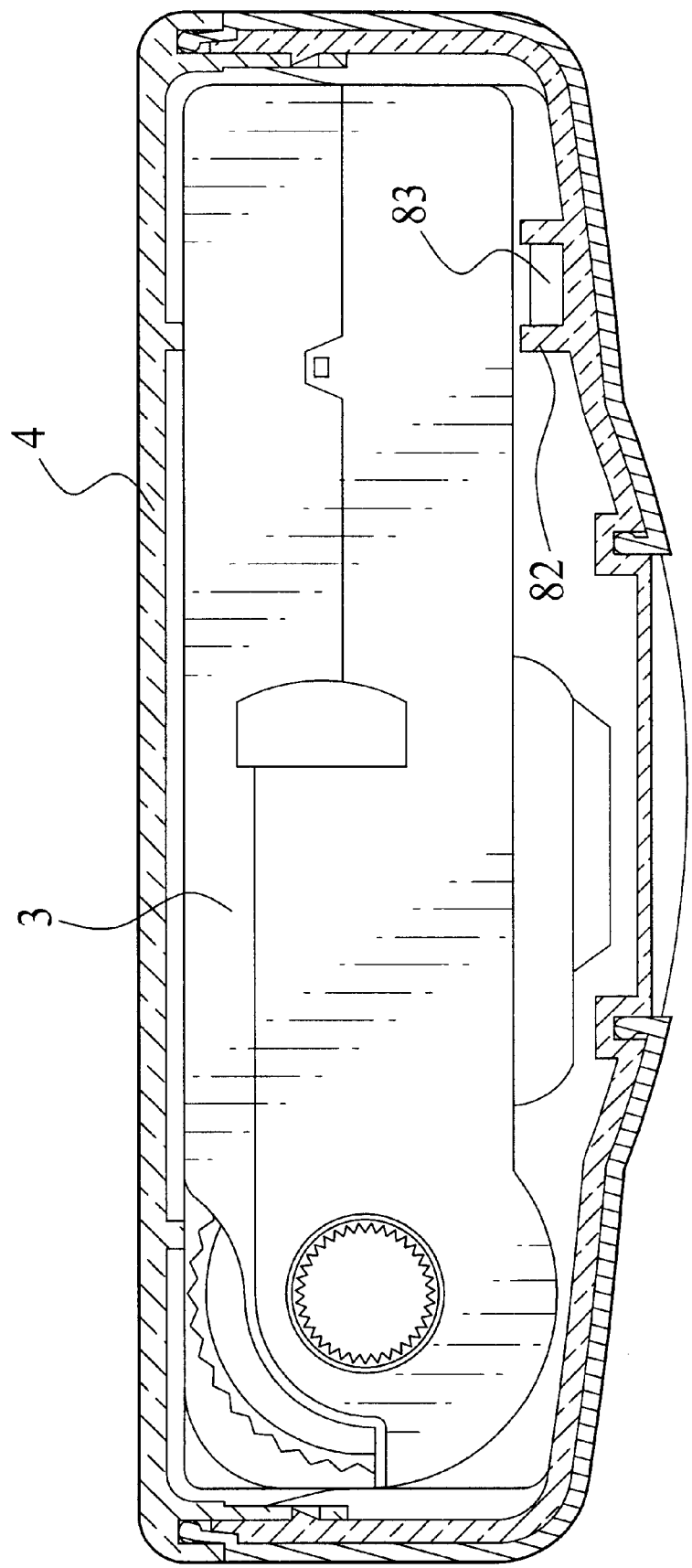
FIG. 4 is a sectional view showing another embodiment of a waterproof film unit.
Figure 5:
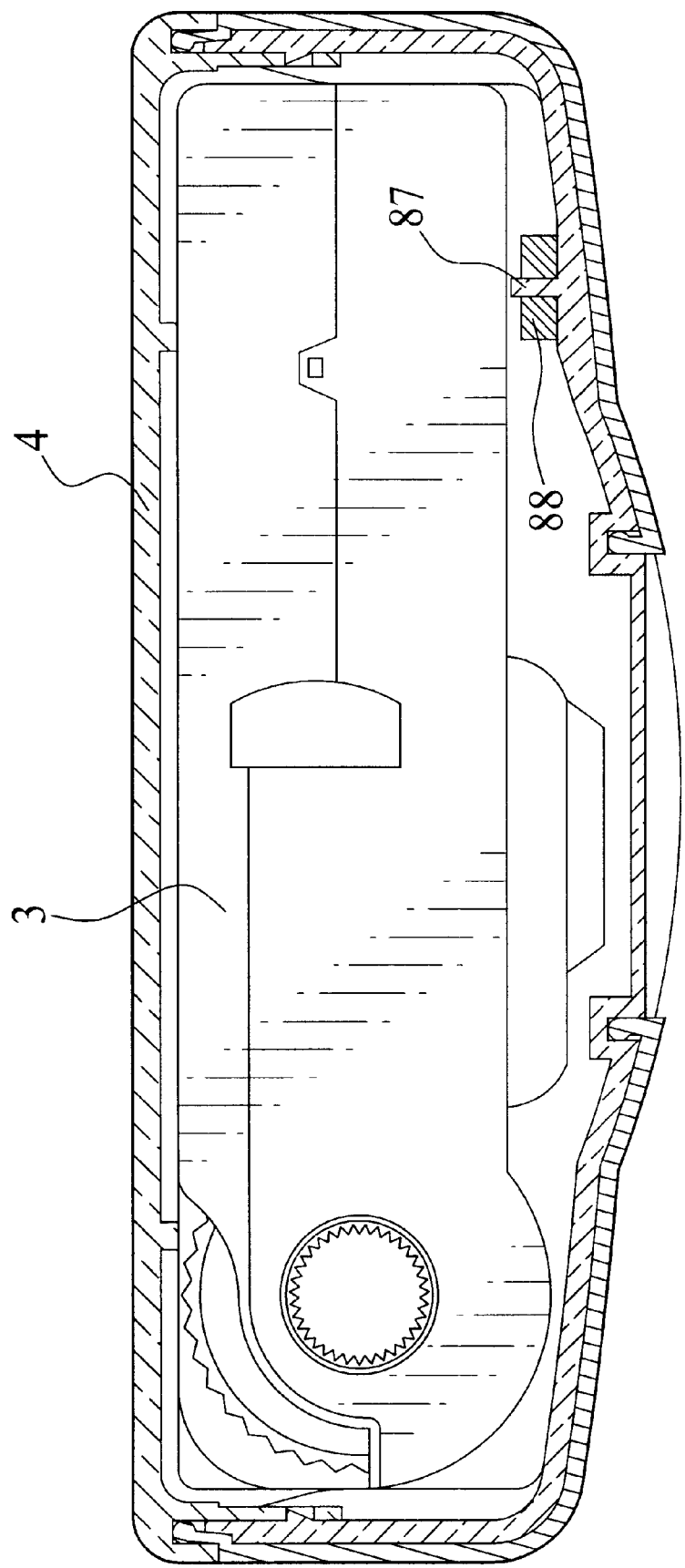
FIG. 5 is a sectional view showing still another embodiment of a waterproof film unit.

In order to dispose the catalyst 30 inside the waterproof housing 4, a hollow cylindrical catalyst supporting portion 82 may be formed inside the waterproof housing 4, as shown in FIG. 4. A catalyst 83 has small disk shape and is fit inside the catalyst supporting portion 82. In addition, a boss 87 may be attached to an internal wall of the waterproof housing 4, as shown in FIG. 5. The boss 87 inserts into a ring shaped catalyst 88.

Furthermore, a mesh seal tape for fixing grained catalysts may be stuck on an internal wall of the waterproof housing 4. A catalyst sheet, in which grained or powdered catalysts are exposed to the front side, may be used such that the rear side of the sheet is stuck on an internal wall of the waterproof housing 4. A recess to fit a catalyst may be formed in an internal wall of the front cover 23 of the film unit 3.

In the above described embodiment, the waterproof cover 34 is provided outside the waterproof front case 32. However, waterproofing is made by the connection between the waterproof front case 32 and the waterproof rear cover 33, the waterproof cover 34 may be omitted. In case of omitting the waterproof cover 34, the waterproof front case 32 and the waterproof rear cover 33 must be connected closely to keep the film unit 3 in a watertight manner.

In the above described embodiment, a waterproof film unit is applied as a waterproof type photographing apparatus. But the present invention is applicable to a camera with photo film and an electric still camera, which are covered with waterproof packages such as the waterproof housing 4. By disposing a catalyst inside the waterproof package, hydrogen gas is removed in the same way as above. Moreover, the present invention is also applicable to an exclusive waterproof housing which has a rear cover pivotally attached to a waterproof front case and a lock mechanism for keeping the waterproof rear cover at a closed position. In such a exclusive housing, disposing a catalyst makes it possible to remove hydrogen gas.

In an electronic still camera without a photo film, it is unnecessary to take a consideration of chemical reducing reaction by hydrogen gas. When hydrogen gas is accumulated too much inside the waterproof cover, however, the electronic still camera may be fired due to sparkling from a contact in an electric circuit. Accordingly, it is desirable to remove hydrogen gas by a catalyst. Water vapor generated by chemical reaction with a catalyst may be caused short cut trouble when spreading to an electric circuit. In order to prevent a short cut trouble because of water vapor, a water absorbent may be disposed in the same way.

Figure 6:
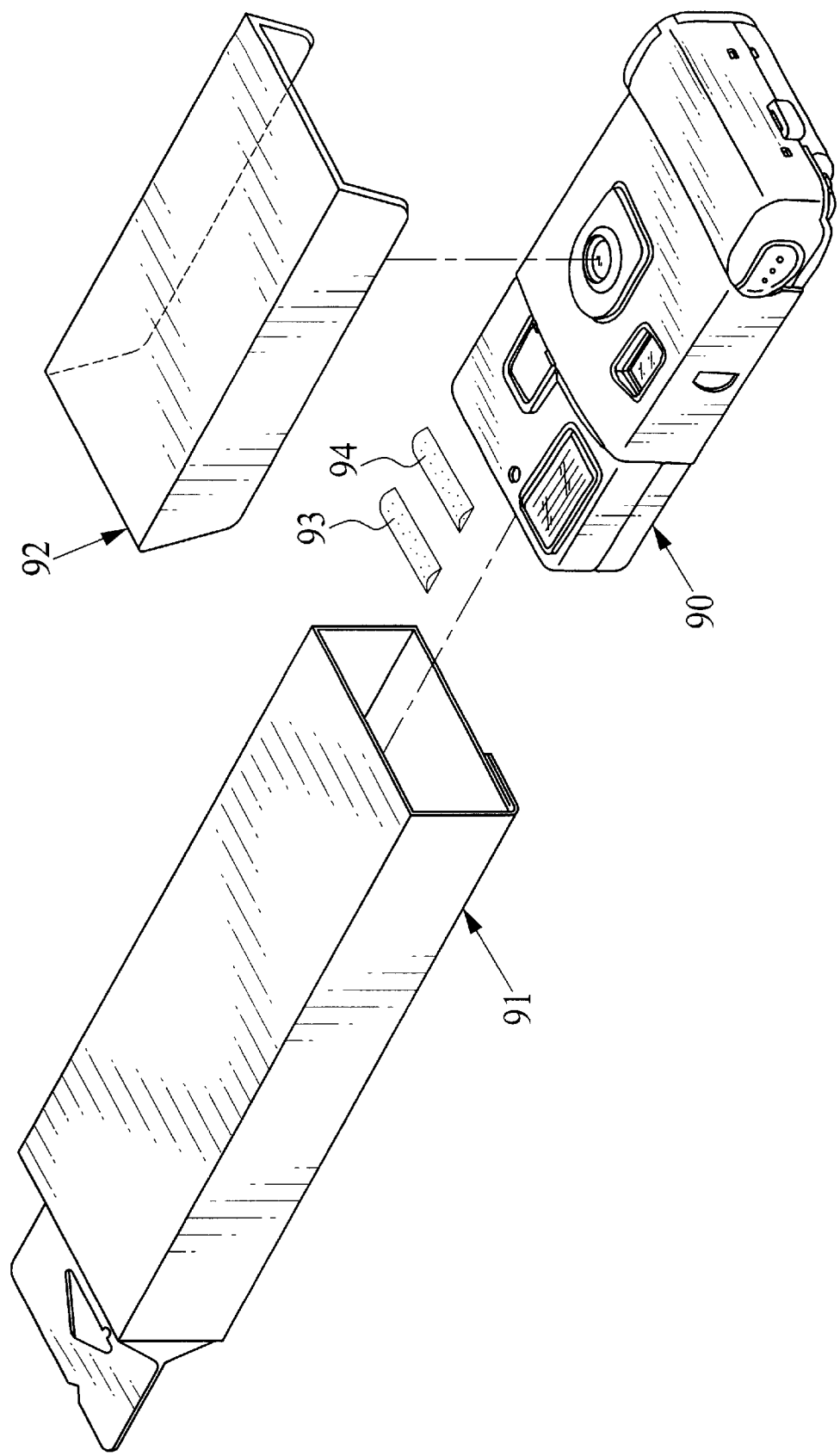
FIG. 6 is an explanatory view showing a packaging bag of the present invention.

The present invention is also applicable to a packaging bag for containing a film unit. As shown in FIG. 6, a film unit 90 with a flash device has a dry battery for supplying electric power to the flash device. The film unit 90 covered with a paper spacer sheet 92 is shipped after being contained closely inside a moistureproof and airtight packaging bag 91. In packaging the film unit 90, a catalyst bag 93 is enclosed. The catalyst bag 93 is comprised of grained catalysts and a ventilative paper bag for containing the grained catalysts.

Grained catalysts in the catalyst bag 93 accelerate the chemical reaction between hydrogen gas generated from a dry battery and oxygen gas left inside the packaging bag 91, for preventing hydrogen gas from being accumulated inside the packaging bag 91. The chemical reaction causes to generate water vapor, but the quantity is extremely small. Moreover, since water vapor is absorbed to the spacer sheet 92 which is dried sufficiently, a photo film is hardly influenced. Nevertheless, it is preferable to include a water absorbent bag 94, which is comprised of water absorbent such as silica gel and a ventilative bag for containing the water absorbent. The bags 93 and 94 may be put together in the packaging bag 91. All processes described above is possible without complicating the process for packaging the film unit.

A package for containing the film unit 90 in a moistureproof manner is not restricted to the above described packaging bag 91. The present invention is also applicable to the case where a plurality of film units 90 are packaged concurrently, or the case where the film unit 90 is contained in the package box that is made of compound paper. In containing a catalyst, it is possible to take various methods. For instance, the catalyst package 93 or a sheet with a catalyst may be stuck on an internal face of the packaging bag, or powdered catalysts may be scattered onto an internal face of the packaging bag just after quick-drying adhesive is applied thereto.

An experiment in inserting a catalyst into the waterproof housing 4 will be described below. The catalyst used in this experiment is comprised of γ-alumina (supporting material) and 0.5 wt. % palladium (manufactured by Nikki Chemical Co., Ltd). The method of this experiment is as follows;

1. Insert one tablet of the catalyst (33 mg) in the waterproof housing 4. In addition, prepare a waterproof housing without the catalyst as a comparative sample.
2. Prepare six samples, by injecting hydrogen gas of 10 cc, 20 cc and 30 cc into the two kinds of waterproof housings shown above. Besides, stick aluminum-evaporated tapes in necessary portions, such that an internal space of the waterproof housing 4 is insulated from outside.
3. Leave these six samples for twenty-four hours under normal temperature (25° C.), and measure an amount of residual hydrogen gas afterwards.

Figures 7, 8:
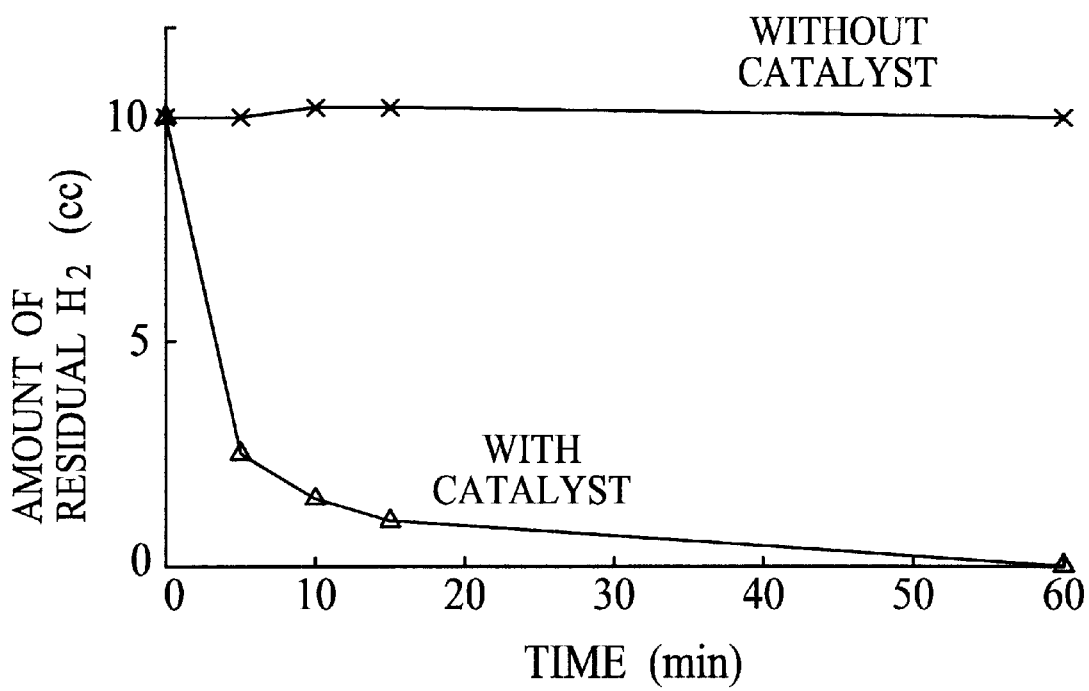
FIG. 7 is a table showing residual amount of hydrogen gas in enclosing a catalyst inside a housing in which hydrogen gas is injected.
FIG. 8 is a graph showing development of hydrogen gas removing effect by a catalyst.

The result of measurement of residual hydrogen gas based on this experiment is shown in FIG. 7. An amount of residual hydrogen gas in the waterproof housing with the catalyst is little, compared to that without the catalyst. Judging from the result, it is found that an amount of hydrogen gas is surely decreased by disposing a catalyst inside the waterproof housing 4. An amount of hydrogen gas in a comparative waterproof housing is decreased, because hydrogen gas escapes through the waterproof housing 4, or leaks from packing portion. An amount of reactable hydrogen gas is depends on an amount of oxygen gas in the waterproof housing 4. Judging from the result, about 60 cc of hydrogen gas can be removed under the same condition.

In order to confirm time dependency of hydrogen gas removing effect, the following experiment is carried out. The catalyst used in this experiment is comprised of aluminum oxide (supporting material) and 0.5 wt. % palladium (manufactured by N.E. Chemcat Corp.). Four samples of waterproof housings (Volume: about 250 cc) of the present invention are prepared, each of which contains one tablet (0.3 g) of the catalyst. As a comparative experiment, four samples of waterproof housings without the catalyst are prepared. After injecting hydrogen gas of 10 cc into each sample, aluminum-evaporated tapes are stuck in necessary portions, such that an internal space of the waterproof housing 4 is insulated from outside, in the same way as the first experiment.

These samples are left under normal temperature (25° C.), and an amount of residual hydrogen gas in the waterproof housing 4 is measured to the two samples with and without the catalyst at 5, 10, 15, 60 minutes. Measurement of residual hydrogen gas is carried out by converting hydrogen gas density measured by a gas chromatography. The result is shown in FIG. 8, in which it is found that the catalyst begins to accelerate the reaction of hydrogen gas just after the catalyst is contained in the waterproof case, and that almost hydrogen gas is removed at 60 minutes.

The catalyst only accelerates the reaction between hydrogen gas and oxygen gas, but is not changed at all by the reaction. Thus, the catalyst is not changed in an order of months or a year. Even if a safety valve of a dry battery or a main capacitor of the flash device are activated because of some trouble, instantaneous discharging amount of hydrogen gas is no more than 10 cc. Moreover, when hydrogen gas is leaked through the safety valve, the amount of leaked hydrogen gas is about 10 cc a month. Therefore, a catalyst weighing about 0.3 g makes it possible to prevent hydrogen gas from being accumulated inside the waterproof housing 4.

Thus, the present invention is not to be limited to the above embodiments, but on the contrary, various modifications are possible to those skilled in the art without departing from the scope of claims appended hereto.

What is claimed is:

1. A waterproof type photographing apparatus having a photographing apparatus and a waterproof housing for contains said photographing apparatus in a watertight manner, said waterproof type photographing apparatus comprising:
   a catalyst that is provided in said waterproof housing and accelerates a chemical reaction for generating water from hydrogen gas and oxygen gas.

2. A waterproof type photographing apparatus as claimed in claim 1, wherein said hydrogen gas is generated by a battery loaded in said photographing apparatus, and said oxygen gas is contained in said waterproof housing.

3. A waterproof type photographing apparatus as claimed in claim 2, further comprising a water absorbent that is provided in said waterproof housing and absorbs said water generated by said chemical reaction.

4. A waterproof type photographing apparatus as claimed in claim 3, wherein said water absorbent is disposed by said catalyst.

5. A waterproof type photographing apparatus having a lens-fitted photo film unit with a flash device that is driven by a dry battery, and a waterproof housing for covering said lens-fitted photo film unit in a watertight manner, said waterproof type photographing apparatus comprising;
   a catalyst that is provided in said waterproof housing and accelerates a chemical reaction for generating water from hydrogen gas and oxygen gas; and
   a water absorbent that is provided in said waterproof housing and absorbs said water generated by said chemical reaction.

6. A waterproof type photographing apparatus as claimed in claim 5, wherein said catalyst is disposed on an upper portion inside said waterproof housing.

7. A waterproof type photographing apparatus as claimed in claim 6, wherein said waterproof housing has a recess for fitting said catalyst.

8. A waterproof type photographing apparatus as claimed in claim 6, wherein said waterproof housing has a protruded portion into which said catalyst is inserted.

9. A waterproof type photographing apparatus as claimed in claim 6, wherein said water absorbent is disposed by said catalyst.

10. A package for lens-fitted photo film unit having a lens-fitted photo film unit with a flash device that is driven by a dry battery, and a packaging bag for containing said lens-fitted photo film unit in an airtight manner, said package comprising:
    a catalyst that is provided in said packaging bag and accelerates a chemical reaction for generating water from hydrogen gas and oxygen gas.

11. A package as claimed in claim 10, further comprising a water absorbent that is provided in said packaging bag and absorbs water generated by said chemical reaction.

12. A package as claimed in claim 11, wherein said water absorbent is disposed by said catalyst.

\* \* \* \* \*